2,794,811
PRODUCTION OF CIS-CYCLOHEXANE-1,2-DI-CARBOXYLIC ANHYDRIDE

Leon O. Winstrom, East Aurora, N. Y., assignor to Allied Chemical & Dye Corporation, New York, N. Y., a corporation of New York No Drawing. Application June 3, 1954,
Serial No. 434,312

5 Claims. (Cl. 260—346.3)

This invention relates to the production of cis-cyclohexane-1,2-dicarboxylic anhydride.

Cis-cyclohexane-1,2-dicarboxylic anhydride is used in organic synthesis and particularly as an intermediate in the manufacture of plasticizers and synthetic resins, such as glyptal type resins. It has been produced by hydrogenating cis-4-cyclohexene-1,2-dicarboxylic anhydride dissolved or suspended in an inert solvent or diluent, such as glacial acetic acid or ethyl acetate in the presence of a catalyst, such as platinum oxide or Raney nickel. Other methods of producing cis-cyclohexane-1,2-dicarboxylic anhydride which have been suggested involve the catalytic hydrogenation of cyclohexene-1,2-dicarboxylic acid and sodium salts thereof, phthalic acid, diethyl phthalate, etc. and conversion of the resulting cis-cyclohexane-1,2-dicarboxylic acid compound to the anhydride. Still another method which has been suggested consists in reducing 1-cyclohexene-1,2-dicarboxylic acid with sodium amalgam and dehydrating the resulting cyclohexane-1,2-dicarboxylic acid to the anhydride.

Products thus produced have been purified by various methods including fractional distillation and crystallization from solvents. The highest melting point of products thus produced, to the best of my knowledge and belief, is 32° C. While the impurities present in these products including those having a melting point of 32° C. are not known exactly, it is believed that they are chiefly cis-4-cyclohexene-1,2-dicarboxylic anhydride and isomers, polymers, lactones and/or corresponding acids of cis-cyclohexane-1,2-dicarboxylic anhydride and cis-4-cyclohexene-1,2-dicarboxylic anhydride as well as maleic and succinic anhydrides (which latter may be present in butadiene-maleic anhydride adducts) and their derivatives of the aforesaid type. The cis-cyclohexane-1,2-dicarboxylic anhydride products heretofore produced, even after subjection to extended and repeated purification treatments have been found unsatisfactory for use in the preparation of epoxy and Epon resins, i. e., resins made by condensing olefin oxides, particularly ethylene oxide with cis-cyclohexane-1,2-dicarboxylic anhydride. The reason for this, while not fully understood, is believed to be due in part at least to the presence of cis-cyclohexane-1,2-dicarboxylic acid and possibly other impurities which are not removed by the purification treatments, such as distillation or crystallization from a solvent, to which the crude products have been subjected.

It is among the objects of this invention to provide a process for producing cis-cyclohexane-1,2-dicarboxylic anhydride which results in an improved product.

It is another object of this invention to provide a process of producing cis-cyclohexane-1,2-dicarboxylic anhydride having a melting or settling point above 35° C. and preferably from 36° C. to 37.5° C., which product is eminently satisfactory for use in the manufacture of resins including epoxy resins.

Other objects and advantages of this invention will be apparent from the following detailed description thereof.

In accordance with the present invention cis-cyclohexane-1,2-dicarboxylic anhydride is produced by hydrogenating molten cis-4-cyclohexene-1,2-dicarboxylic anhydride at a temperature not exceeding about 150° C. in the presence of a hydrogenation catalyst, preferably a silica supported nickel catalyst and in the absence of a solvent or diluent for cis-4-cyclohexene-1,2-dicarboxylic anhydride (other than the cis-cyclohexane-1,2-dicarboxylic anhydride produced). In other words, the reaction mixture through which the hydrogen is passed initially contains only the molten cis-4-cyclohexene-1,2-dicarboxylic anhydride and the hydrogenation catalyst.

Surprisingly it has been found that by observing these conditions, a crude cis-cyclohexane-1,2-dicarboxylic anhydride is produced which has a setting point above 35° C. and which can be purified to produce products having a setting point as high as 37.5° C., which products are eminently satisfactory for use in producing resins, including epoxy resins. The differences between the products of this invention having a setting point above 35° C. and cis-cyclyohexane-1,2-dicarboxylic anhydride products heretofore known is not a difference in degree, but in substance, as is demonstrated by the fact that the products of this invention are eminently satisfactory for use in producing epoxy resins whereas the cis-cyclohexane-1,2-dicarboxylic anhydride products heretofore known, even after extensive purification, do not result in satisfactory epoxy resins.

As the cis-4-cyclohexene-1,2-dicarboxylic anhydride subjected to hydrogenation it is preferred to use products having a setting point of at least 100° C. obtained by Diels-Adler addition of 1.3-butadiene to maleic anhydride. (Pure cis-4-cyclohexene-1,2-dicarboxylic anhydride melts at 104° C.)

As above indicated, the catalyst used is preferably a silica supported nickel catalyst. Such catalyst may be prepared, for example, by coating a finely divided silica carrier with metallic nickel in any suitable manner. Thus, a nickel hydroxide or carbonate obtained for example by reaction of an alkali metal or ammonium hydroxide or carbonate with a soluble nickel salt, such as nickel nitrate, acetate or sulfate, may be precipitated on the carrier particles and the resultant coated carrier particles heated in a reducing atmosphere at a sufficiently high temperature to reduce the nickel compound to metallic nickel. The catalyst should be free of traces of alkali metal ions. Accordingly, if an alkali metal hydroxide or carbonate is used in the production of the catalyst, the resultant catalyst should be washed to remove completely alkali metal ions which may be present in the precipitate. The use of ammonium hydroxide or ammonium carbonate to effect precipitation of the nickel eliminates the necessity for employing such washing step. The amount of catalyst used is not critical; in general from 1 to 5% of catalyst based on the weight of cis-4-cyclohexene-1,2-dicarboxylic anhydride will be found adequate.

The hydrogenation may be carried out under atmospheric or superatmospheric pressure and at a temperature not exceeding 150° C. Temperatures below 120° C. result in considerably slower reaction rate. It is preferred to operate within the range of 120° C. to 140° C.

When the hydrogenation reaction is complete the cis-cyclohexane-1,2-dicarboxylic anhydride can be separated from the catalyst in any suitable manner, e. g., by filtration or decantation, etc. The catalyst can be reused, if desired.

The cis-cyclohexane-1,2-dicarboxylic anhydride thus obtained by filtration to remove the catalyst may have a setting point as high as 36° C. By fractional distillation in vacuo, as illustrated in Example II below, products of greater purity having a setting point as high as 37.5° C. may be obtained. Lights fractions obtained in such distillations may be combined with fresh material and fractionally distilled. A better procedure for recovering the cis-cyclohexane-1,2-dicarboxylic anhydride content of lights fractions is to heat them with water to effect conversion to the corresponding acid, which is then crystallized from water, thermally dehydrated to the anhydride, and the latter fractionally distilled under vacuum.

The following examples are given for purposes of illustrating the invention. It will be understood the invention is not limited to these examples.

In these examples, a silica supported nickel catalyst essentially free of alkali metal ions prepared as hereinabove described was employed. The cis-4-cyclohexene-1,2-dicarboxylic anhydride used in these examples was obtained by Diels-Alder addition of 1,3-butadiene to maleic anhydride.

EXAMPLE I 1200 grams of cis-4-cyclohexene-1,2-dicarboxylic anhydride having a setting point of 101° C. and 50 grams of the catalyst were charged into a hydrogenation apparatus provided with a high speed agitator. The charge was heated to 130° C. and pure hydrogen gas bubbled in for about 15 hours while agitating the reaction mixture at 130° C. under atmospheric pressure until hydrogen absorption ceased. At this point the substantially theoretical amount of hydrogen required for the reaction had been absorbed. The mixture was then filtered to remove the catalyst. The cis-cyclohexane-1,2-dicarboxylic anhydride thus obtained as the filtrate had a setting point of 36.2° C. and was obtained in substantially quantitative yield.

EXAMPLE II 1139 grams of cis-4-cyclohexene-1,2-dicarboxylic anhydride having a setting point of 100.2° C. and 50 grams of the catalyst were charged into a hydrogenator. The charge was heated to 130° C. and hydrogen gas introduced at a rate initially of about 2 cubic feet per hour and shortly thereafter at a rate of about 1 cubic foot per hour while agitating the reaction mixture at 130° C. under atmospheric pressure until absorption of hydrogen ceased. At this point the substantially theoretical amount of hydrogen required for the reaction had been absorbed. This took about 6 hours. The hydrogen feed was then stopped and the mixture was allowed to settle at 135° C. for 4 hours. A clear supernatant layer of cis-cyclohexane-1,2-dicarboxylic anhydride thus obtained was decanted from the settled catalyst.

Fresh cis-4-cyclohexene-1,2-dicarboxylic anhydride in the amount indicated in the table which follows, was charged to the hydrogenator and the hydrogenation process was repeated as described above. The catalyst was thus re-used in nine successive hydrogenation runs as shown in the following table.

Table

| Run | Cis-4-cyclohexene-1,2-dicarboxylic anhydride charged | | Cis-cyclohexane-1,2-dicarboxylic anhydride separated by decantation | |
|---|---|---|---|---|
| | Setting Point, °C. | Grams | Setting Point, °C. | Gms |
| 1 | 100.2 | 1,139 | 32.5 | 938 |
| 2 | 100.2 | 917 | 33.0 | 944 |
| 3 | 100.2 | 969 | 33.0 | 989 |
| 4 | 100.8 | 973 | 32.5 | 978 |
| 5 | 100.8 | 959 | 33.7 | 970 |
| 6 | 100.8 | 947 | 33.2 | 972 |
| 7 | 100.8 | 1,200 | 33.0 | 1,227 |
| 8 | 100.8 | 1,089 | 34.0 | 1,114 |
| 9 | 100.8 | 966 | 34.4 | 1,064 |
| Total | | 9,159 | | [1] 9,196 |

[1] Equals 99% of theory.

2000 grams of the cis-cyclohexane-1,2-dicarboxylic anhydride product produced by mixing the product resulting from a number of the runs hereinabove described, which composite product had a setting point of 33.7° C., was purified by fractional distillation under an absolute pressure of 17 mm. mercury. In this distillation the charge was first heated to 180° C. to 190° C. at 17 mm. mercury absolute pressure under a reflux condenser adjusted to permit water vapors formed to escape but to condense and return the anhydride. In this way any cis-cyclohexane-1,2-dicarboxylic acid present was converted to the anhydride. The mass was then distilled and distillate boiling up to 158° C. at 17 mm. mercury pressure was collected as a forerun or light fraction, and distillate boiling from 158° C. to 160° C. at 17 mm. mercury pressure was collected as the main fraction. A purified cis-cyclohexane-1,2-dicarboxylic anhydride of setting point 36.0° C. was thus obtained in over 90% yield based on cis-4-cyclohexene-1,2-dicarboxylic anhydride hydrogenated. This product was found eminently satisfactory for use in producing epoxy resins.

It will be noted that this invention provides a process of producing cis-cyclohexane-1,2-dicarboxylic anhydride which results in an improved product, having a setting point above 35° C., which product, unlike cis-cyclohexane-1,2-dicarboxylic anhydride products heretofore known, is eminently satisfactory for use in the production of epoxy resins.

Such improved product may be produced directly without requiring any purification treatment (as in the case of Example I, the product of which has a setting point of 36.2° C.) or by subjecting the product to a simple purification treatment as disclosed in connection with Example II.

Since different embodiments of this invention could be made without departing from the scope thereof, it is intended that all matter contained in the above description shall be interpreted as illustrative and not in a limiting sense.

What is claimed is:

1. A process of hydrogenating cis-4-cyclohexene-1,2-dicarboxylic anhydride to produce cis-cyclohexane-1,2-dicarboxylic anhydride, which comprises carrying out the hydrogenation of cis-4-cyclohexene-1,2-dicarboxylic anhydride in a molten condition at a temperature not exceeding 150° C., in the absence of a diluent and in the presence of a hydrogenation catalyst.

2. A process of hydrogenating cis-4-cyclohexene-1,2-dicarboxylic anhydride to produce cis-cyclohexane-1,2-dicarboxylic anhydride, which comprises carrying out the hydrogenation at a temperature of 120° to 140° C. in the presence of a hydrogenation catalyst and in the absence of a diluent.

3. A process which comprises passing hydrogen into a molten mass consisting of cis-4-cyclohexene-1,2-dicarboxylic anhydride and a nickel hydrogenation catalyst at a temperature not exceeding 150° C. until the cis-4-cyclohexene-1,2-dicarboxylic anhydride is converted to cis-cyclohexane-1,2-dicarboxylic anhydride.

4. A process which comprises passing hydrogen into a molten mass consisting of cis-4-cyclohexene-1,2-dicarboxylic anhydride and a silica supported nickel catalyst free of alkali metal ions at a temperature within the range of 120° to 140° C. until the cis-4-cyclohexene-1,2-dicarboxylic anhydride is converted to cis-cyclohexane-1,2-dicarboxylic anhydride.

5. A process which comprises passing hydrogen into a molten mass consisting of a butadiene-maleic anhydride adduct and a silica supported nickel catalyst free of alkali metal ions at a temperature within the range of 120° to 140° C. until said adduct is converted to cis-cyclohexane-1,2-dicarboxylic anhydride.

References Cited in the file of this patent

UNITED STATES PATENTS 2,601,075   Wicklatz _____ June 17, 1952

OTHER REFERENCES

Kohler et al.: JACS 60, pp. 2144–2145 (1938).
Jenkins et al.: JACS 68, p. 2733 (1946).
Willstatter et al.: Berichte 51, pp. 771–773 (1918).